United States Patent

[11] 3,599,235

[72] Inventor David Christopher Haigh
London, England
[21] Appl. No. 720,513
[22] Filed Apr. 11, 1968
[45] Patented Aug. 10, 1971
[73] Assignee The General Electric Company Limited
London, England
[32] Priority Apr. 12, 1967
[33] Great Britain
[31] 16,883/67

[54] ROUTE SELECTING SYSTEM IN A TELEPHONE EXCHANGE
5 Claims, 10 Drawing Figs.

[52] U.S. Cl. .......... 179/18
[51] Int. Cl. .......... H04q 3/56
[50] Field of Search .......... 179/18.1, 18.21, 18.211, 18.7

[56] References Cited

UNITED STATES PATENTS 3,231,679 1/1966 Lowry .......... 179/18 (.211)
3,180,940 4/1965 Korber .......... 179/18 (.1)
3,051,793 8/1962 Hiller et al. .......... 179/18 (.7 YA)
3,482,043 12/1969 Mathews .......... 179/18 (.7 Y)

*Primary Examiner*—Kathleen H. Claffy
*Assistant Examiner*—Thomas W. Brown
*Attorney*—Kirschstein, Kirschstein and Ottinger

ABSTRACT: A telephone switching system, for example a P.A.B.X., has tandem-connected A, B and C switching stages connected between input speech paths and supervisory units of a plurality of different types which types are utilized for different types of call through the system. Each switching stage consists of a plurality of full-availability reed relay switch units. There is only a single A–B link between each A switch unit and each B switch unit and a single B–C link between each B switch unit and each C switch unit. Selection of a free route through the switching stages between an input path and a free supervisory unit of a particular type to which the path is to be connected is effected by selecting each C switch unit in turn and examining the pairs of links from each B switch unit to the A switch unit to which the line is connected and to the selected C switch unit to ascertain if there is a free route to that C switch unit. When a suitable C switch unit is found, the pairs of links terminating on the individual B switch units are examined in turn to find a suitable B switch unit. Finally, a free supervisory unit connected to the selected C switch unit is chosen and the required connection through the three stages can then be established.

INVENTOR

DAVID CHRISTOPHER HAIGH

BY Kemon, Palmer & Estabrook

ATTORNEYS

INVENTOR

DAVID CHRISTOPHER HAIGH

BY [signature]

ATTORNEYS

Figure 1:
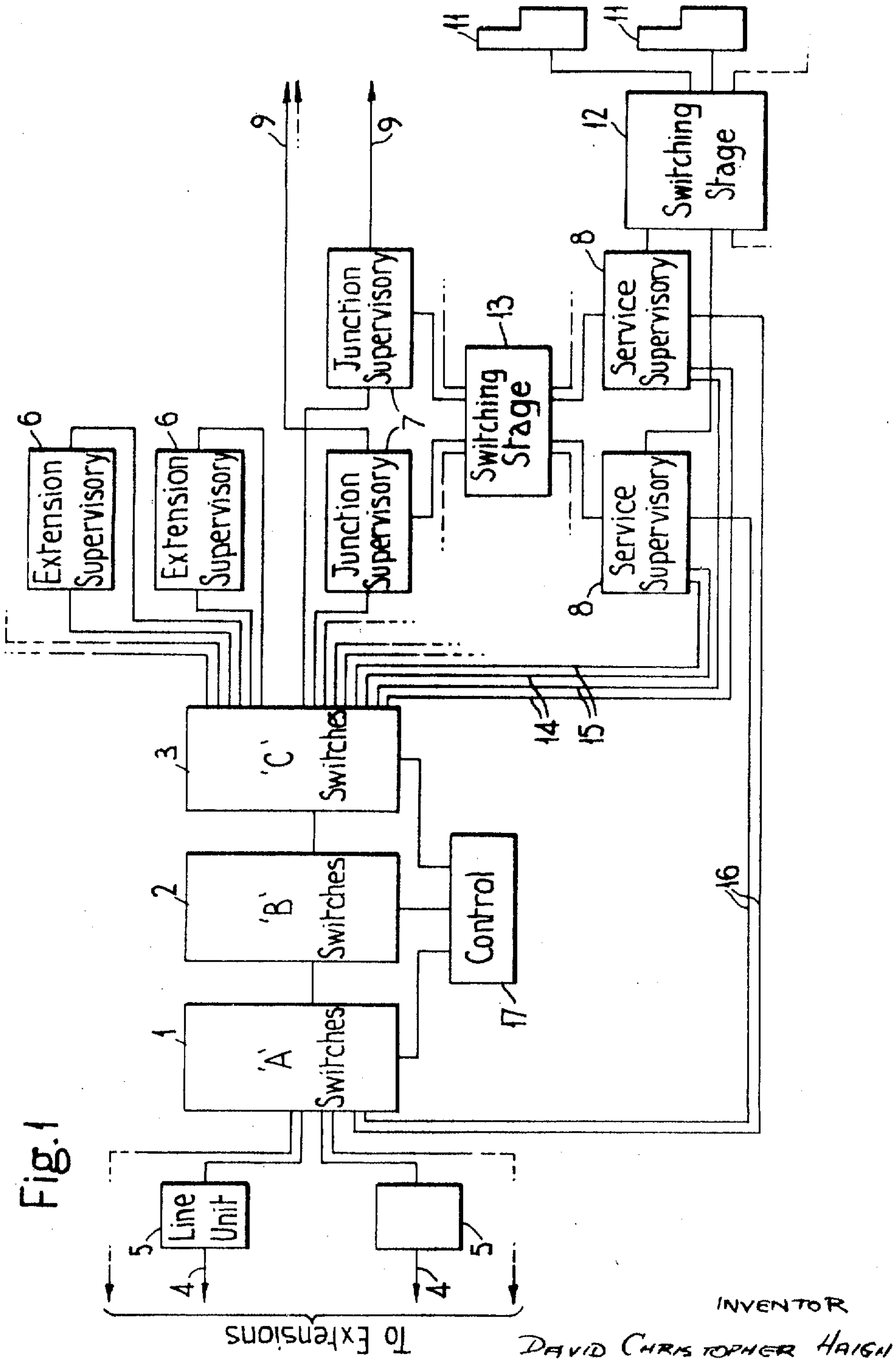

INVENTOR
DAVID CHRISTOPHER HAIGH
BY
ATTORNEYS

INVENTOR
David Christopher Haigh
BY Kimmelman, Frankel & Ottinger
ATTORNEYS

INVENTOR
DAVID CHRISTOPHER HAIGH
BY Fleit, Gipple & Jacobson [signature]
ATTORNEYS INVENTOR
DAVID CHRISTOPHER HAIGH
BY
[signature]
ATTORNEYS INVENTOR
DAVID CHRISTOPHER HAIGH
BY
Kemelen, Kemelen & Otega
ATTORNEYS INVENTOR
DAVID CHRISTOPHER HAIGH
BY Kemon, Palmer & Estabrook [signature]
ATTORNEYS

INVENTOR
DAVID CHRISTOPHER HAIGH
BY
ATTORNEYS

ROUTE SELECTING SYSTEM IN A TELEPHONE EXCHANGE

This invention relates to telecommunications switching systems.

More particularly the invention is concerned with telecommunications switching systems of the kind having three tandem-connected switching stages which are subsequently referred to as A, B and C stages respectively and each of which comprises a plurality of switch units that are each adapted to provide full availability switching between a plurality of inlets and a plurality of outlets thereof. Each of these switch units may be formed by a matrix of reed relays.

The invention is more particularly, but not exclusively, concerned with automatic telephone switching systems, for example for use in a private branch telephone exchange.

One object of the present invention is to provide an improved telecommunication switching system of the kind specified in which there is provision for identifying in relatively simple manner a free route through the switching stages when a connection is to be set up through the switching system.

According to the present invention a telecommunications switching system of the kind specified has only a single connecting path (subsequently termed an "A–B link") between each A switch unit and each B switch unit and only a single connecting path (subsequently termed a "B–C link") between each B switch unit and each C switch unit and the switching system also includes control apparatus which is arranged to select a free route through the A, B and C switch units in dependence upon the A–B and B–C links that are free prior to setting up a connection over that route.

There may be a plurality of different types of circuit connected to each C switch unit, these different types of circuit being associated with different types of call. (For example if the switching system is incorporated in a private branch telephone exchange, two types of circuit might be the inlet and outlet circuits respectively of a unit utilized for supervising calls between two subscribers both directly connected to the exchange in question, another type might be the inlet circuit of a unit utilized for supervising incoming or outgoing calls over a junction circuit while yet another type might be the inlet circuit of a unit utilized for supervising calls involving the intervention of an operator. For the present purpose, inlet circuits of units for supervising calls over different junction circuit routes are considered as different types of circuit.)

When a connection is to be set up through the A, B and C switching stages from an input path connected to a particular A switch unit and a circuit of a particular one of said types, the C switch units may effectively be interrogated sequentially until one is found which has a free circuit of the particular type connected thereto and to which connection can be set up through the A and B stages; subsequently the B switch units are interrogated sequentially until one is found through which a connection can be made between the particular A switch unit and the C switch unit found as the result of the preceding interrogation while, if there is more than one unit of the required type connected to the particular C switch unit, these units are sequentially interrogated until a free one is found. For this purpose the control apparatus may comprise means to apply a first voltage to one conductor of each free A–B link that is terminated by the A switch unit to which the input path is connected, means to apply a second voltage (which may be the same as the first voltage) to one conductor of each B–C link that is terminated by at least one free circuit of the type to which connection is required, and testing means to test simultaneously the A–B and B–C links terminating on one or more of the B switch units for the purpose of detecting said voltages, the control apparatus being arranged (1) to apply the second voltage to the B–C links terminating on each C switch unit in turn until a C switch unit is found by testing means having (a) a free circuit of the required type connected thereto and (b) a free route thereto from the particular A switch unit through an as yet unidentified B switch unit, (2) subsequently to apply the second voltage to only the B–C links terminated by the C switch unit found at (1) and to select the B switch units in turn until one is found by said testing means having free links to both said particular A switch unit and said C switch unit and (3), if there are more than one circuit of the required type connected to the C switch unit in question, to select one of those circuits that is free.

Prior to selecting the C switch units in turn as stated in the last paragraph, a "blanket" test may be performed by said testing means to test simultaneously for the presence of said voltages on an A–B link and one or more B–C links that are terminated on any unidentified B switch unit so as to ensure that a free route is available through the switching stages before commencing the sequence of selecting such a route.

Figure 2:
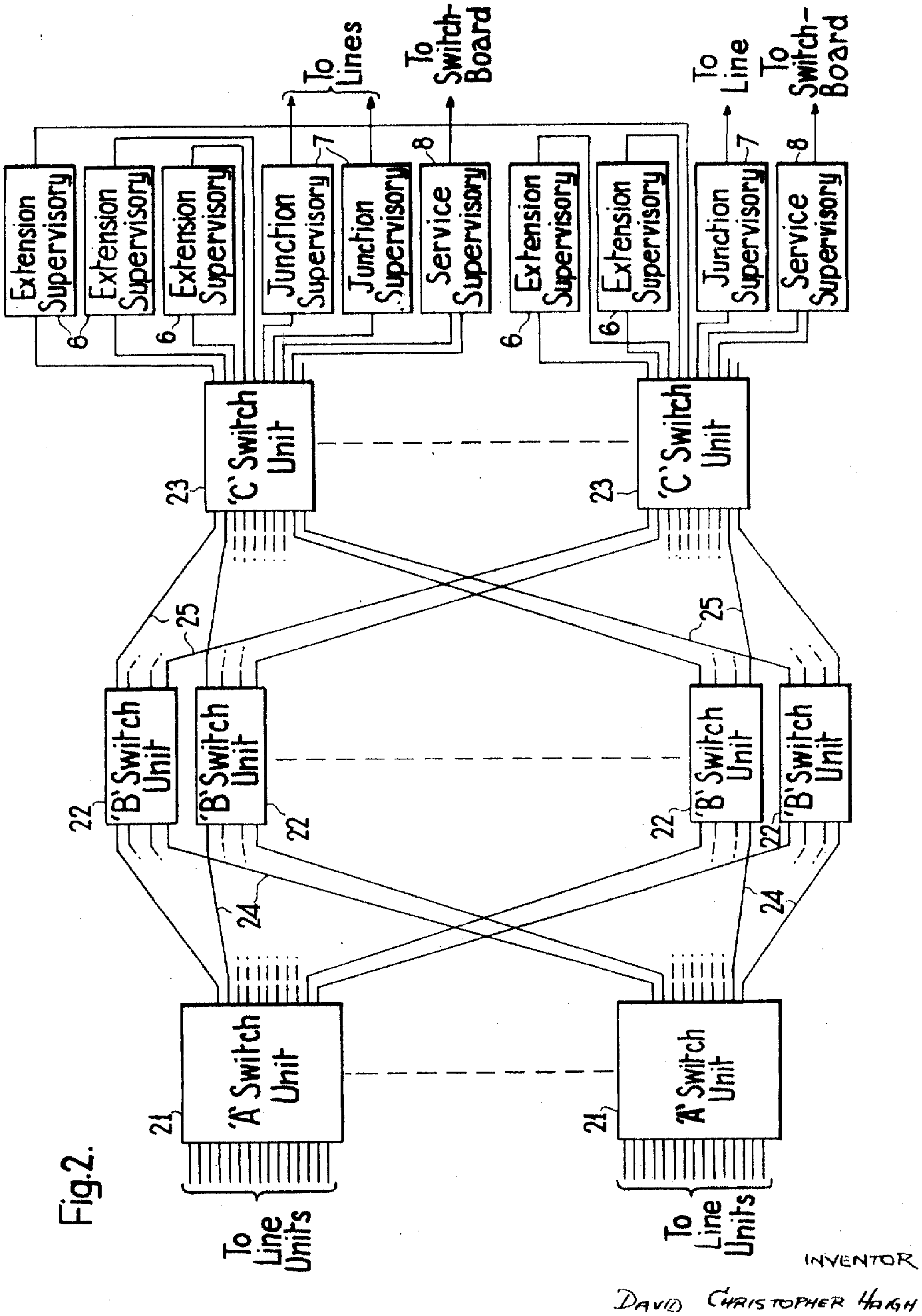
Figure 3:
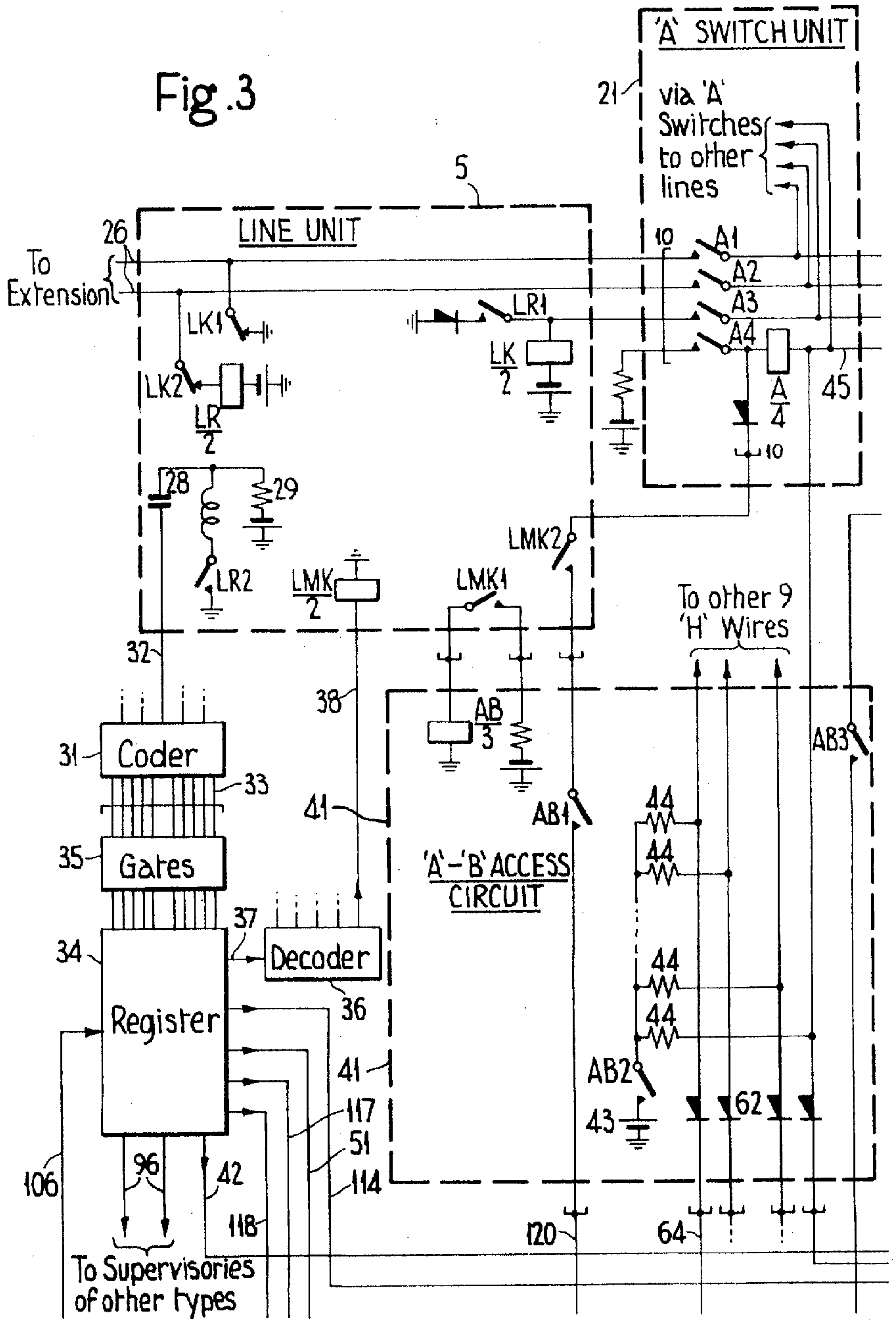
Figure 4:
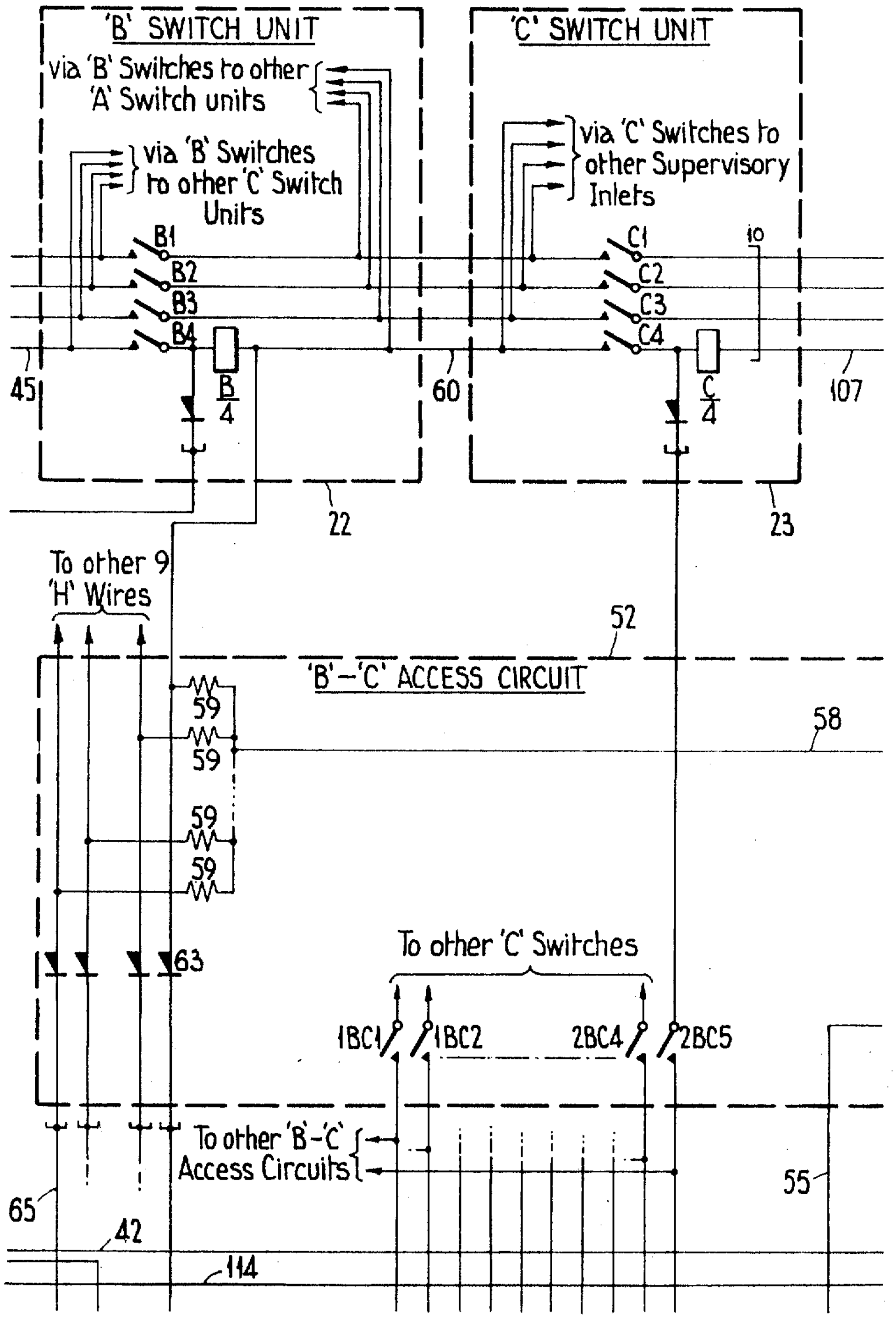
Figure 9:
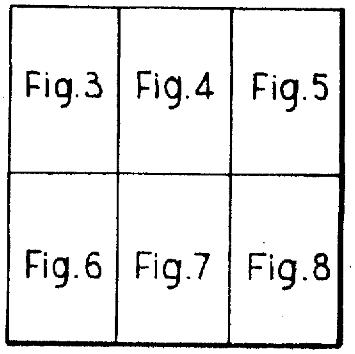
Figure 10:
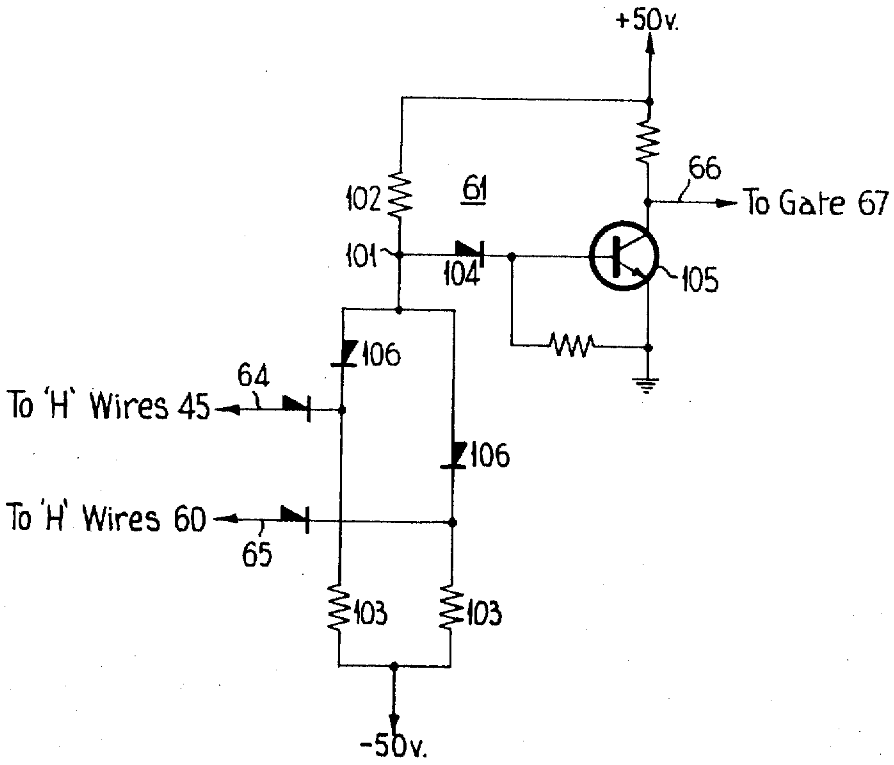

A private branch telephone exchange incorporating a switching system in accordance with the present invention and will now be described by way of example with reference to the accompanying drawings in which FIG. 1 shows the complete exchange diagrammatically, FIG. 2 shows diagrammatically the trunking between the switching stages of the exchange, FIGS. 3 to 8, when arranged as in FIG. 9, show in more detail the circuit of part of the switching stages for setting up one connection therethrough and the circuit of the associated control apparatus, and FIG. 10 shows the circuit of part of the control apparatus.

Referring now to FIG. 1 of the accompanying drawings, the exchange has three successive switching stages 1, 2 and 3. Each of these switching stages 1, 2 and 3 is formed by a matrix of reed relay switches to provide full availability switching, the individual switches of these stages 1, 2 and 3 being subsequently referred to as "A switches", "B switches" and "C switches" respectively. Each of these switches A, B and C is effectively a multipole switch which is adapted, when operated, to provide a single path through the appropriate switching stage 1, 2 or 3, each of these paths consisting of four separate conductors, namely two speech conductors, the associated "private" (or "P") wire, and a holding (or "H") wire for that switch.

The extension parties of the exchange are connected to the switching stage 1 by way of line wires 4, each extension party having an individually associated line unit 5.

The switching stage 3 is connected to three types of supervisory units 6, 7 and 8. These three types of unit are utilized for handling different kinds of call through the exchange, each of the units 6, 7 and 8 being subsequently referred to as an "extension supervisory," a "junction supervisory" and a "service supervisory" respectively.

An extension supervisory 6 is used for a call between two extension parties connected to the exchange. It will be noted that each extension supervisory 6 has two paths connected to the switching stage 3; one of these paths is used for setting up a connection between the calling extension and the extension supervisory 6 by way of the switching stages 1, 2 and 3 while the other path is used for setting up the connection through the stages 1, 2 and 3 between the extension supervisory 6 and the called extension.

A junction supervisory 7 is used for a call between an extension party (either as a calling party or as a called party) and a line 9 which may, for example, be a tie line to another exchange. Each line 9 has its associated junction supervisory 7.

There is also provision for calls through the exchange to be set up and/or supervised by an operator and for this purpose there are a plurality of operators' switchboards 11. Such a call involves one of the service supervisories 8. Each switchboard 11 is adapted to handle five calls at a time and for this purpose is provided with five call control circuits (not shown in FIG. 1). Connections between a switchboard 11 and a service supervisory 8 are effected by way of a full availability switching stage 12 so that any one of said control circuits may be "connected" to any service supervisory 8. Connections between the junction supervisory 7 and the service supervisories 8 are effected by way of a full availability switching stage 13. The switching stages 12 and 13 are preferably formed by matrices of reed relay switches. It may be mentioned here that, for the purpose of handling certain kinds of call as discussed more fully in the complete specification of copending British Pat. application No. 1757/67, each service supervisory 8 is connected to outlets of the switching stage 3 by way of leads that are represented by the lines 14 and 15 respectively and is also connected to an inlet of the switching stage 1 by way of leads represented by a line 16.

Referring now also to FIG. 2 of the accompanying drawings, the A, B and C switches of the switching stages 1, 2 and 3 are arranged to form a plurality of switch units 21, 22 and 23, each of these units being formed by a matrix of reed relay switches that provides full availability switching. The several switch units 21, 22 or 23 forming each of the switching stages 1, 2 and 3 are identical although the switch units 21, 22 and 23 generally differ from one another in their numbers of inlets and outlets as will subsequently be apparent. (To avoid possible confusion it is desirable to mention that the words "inlet" and "outlet" are used herein merely for the purpose of identification and do not have any significance as to the flow of signals since both inlets and outlets of the switch units are strictly two-way ports.)

Each switch unit 21 has 10 outlets and a plurality, for example 15, inlets. The exact number of inlets of each switch unit 21 and the number of such units is dependent upon the total number of extension parties connected to the exchange and the traffic loading.

There are 10 switch units 22 and each of these has the same number of inlets and outlets (this number conveniently being a multiple of five so as to enable the switch units 22 as well as the switch units 21 and 23 to be built up from standard "five times five" switching blocks) that is not less than the number of switch units 21. Outlets of the switch units 21 and inlets of the switch units 22 are connected one to one by a plurality of A–B links 24 (each of which, of course, comprises four separate conductors). In fact the 10 outlets of each switch unit 21 are connected in this manner to one inlet of each of the 10 switch units 22.

There are preferably the same number of switch units 23 as there are switch units 21 and each switch unit 23 typically has 10 inlets and 10 outlets as shown in the drawing. B–C links 25 are provided between the switch units 22 and 23 in similar manner to the links 24 between the units 21 and 22, the 10 inlets of each switch unit 23 being individually connected to one outlet of each of the switch units 22.

Supervisory units 6, 7 and 8 are connected to the outlets of the switch units 23.

When a connection is to be set up through the switching stages 1, 2 and 3, the appropriate A, B and C switches that identify a free path through those stages are operated by common control apparatus 17 (FIG. 1). Although the exchange may handle a plurality of calls at any time, the control apparatus 17 is only capable of dealing with one call at a time and, as will subsequently be described, is brought into use for the purpose of supplying signals to control the operation of A, B and C switches as required. When the apparatus 17 is brought into use, it rapidly carries out a sequence of operations to ascertain a free route through the switching stages 1, 2 and 3 and this is effected, as will now be described, by testing the A–B and B–C links 24 and 25 to ascertain which of them are free.

The sequence of operations involved in setting up a connection from a calling extension party to a free supervisory unit 6, 7 or 8 will now be described in more detail with reference to FIGS. 3 to 8 of the accompanying drawings. When the extension party initiates a call by looping the line wires 26 a line relay LR in the appropriate line unit 5 is operated. Contacts LR1 closing apply earth potential to the "P" wire 27 so as to "busy" the line unit in question. Closure of contacts LR2 complete a discharge path for a capacitor 28 that was previously charged by way of a resistor 29 so that a pulse is applied to a coder 31 over a lead 32.

The coder 31 is common to all the line units 5 of the exchange and is of the Diamond ring type. This coder in fact comprises a plurality of sets typically each of five ferrite cores, each of these sets corresponding to one decimal digit of an extension number and each lead 32 threading through two of the cores of each such set. Thus when a pulse is supplied over the lead 32, signals are supplied by the coder 31 over a group of leads 33, these signals characterizing the number of the calling extension according to the two-out-of-five code.

Figure 6:
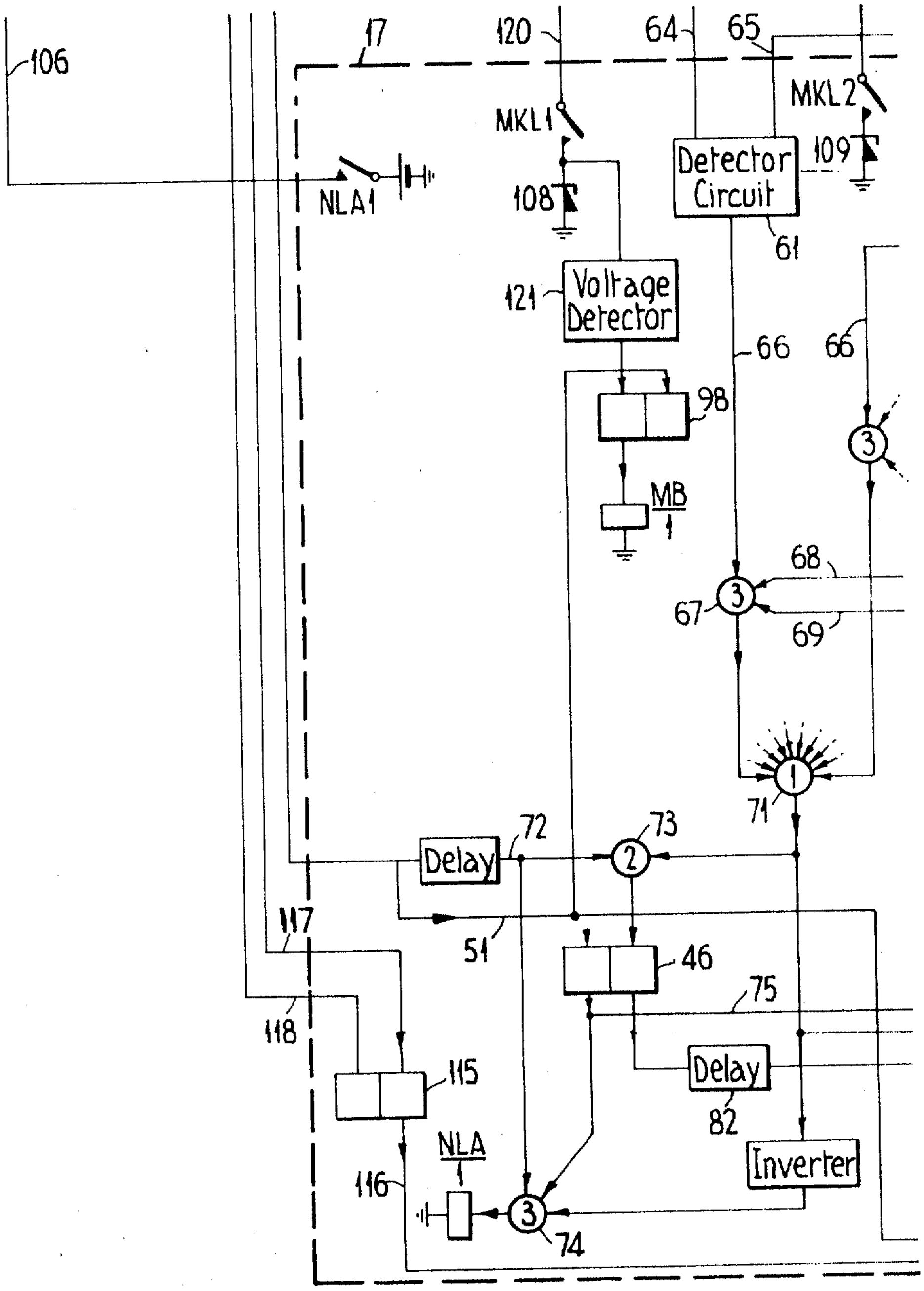
Figure 7:
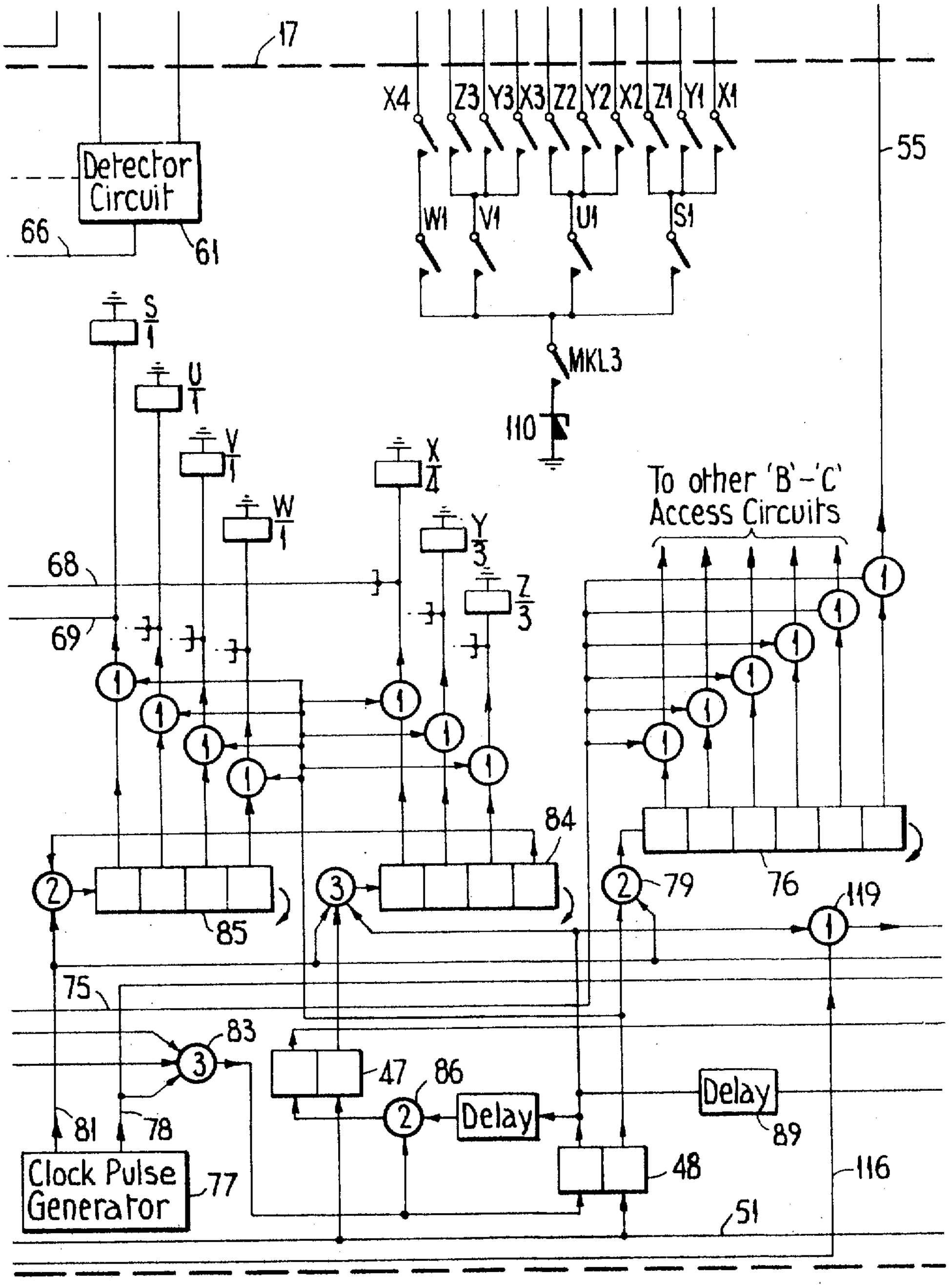
Figure 8:
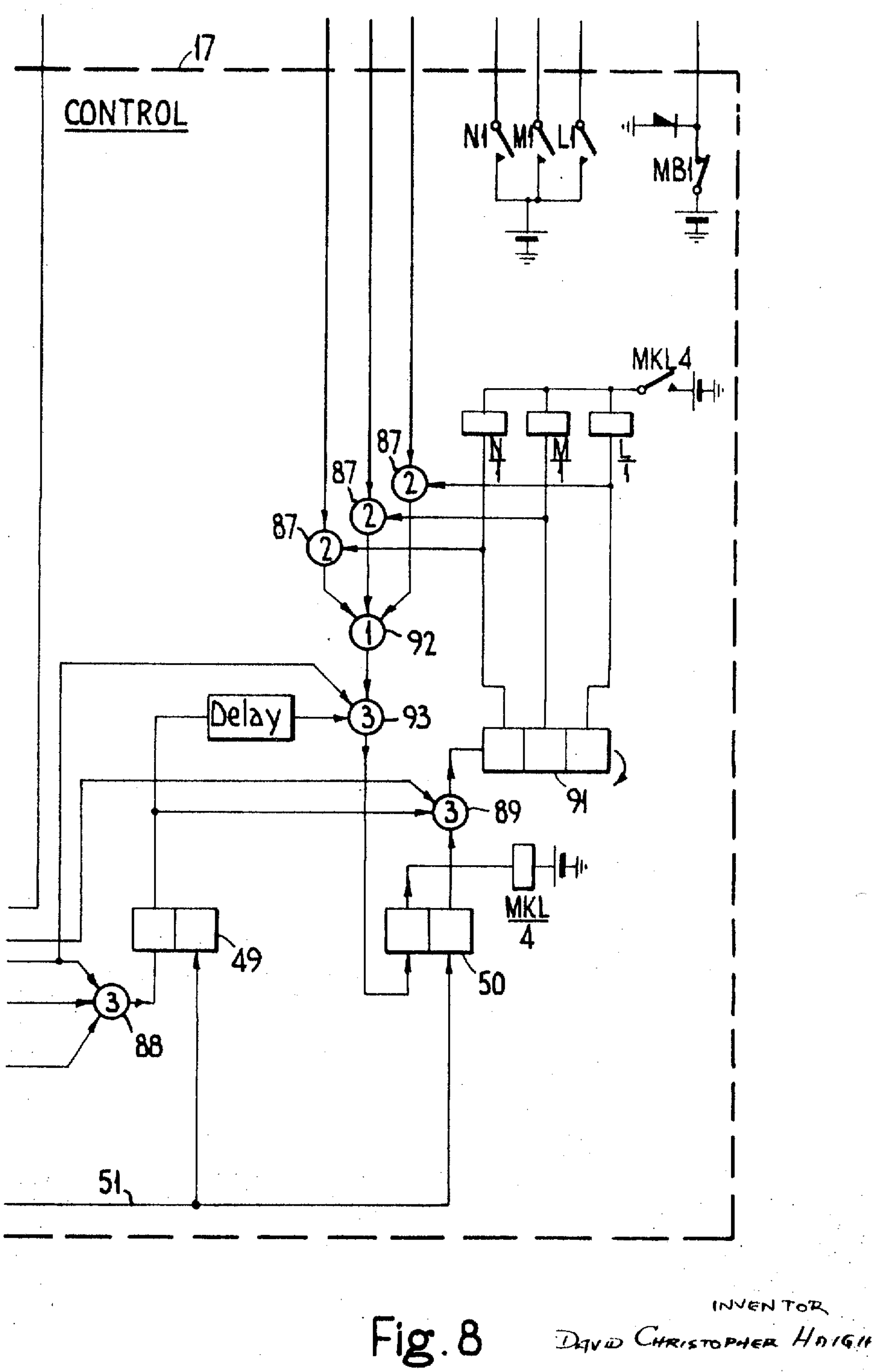

The exchange also has a plurality of registers that are used for temporarily storing information while a call is being set up and one such register 34 is shown in FIG. 6. A register allotter (not shown) is arranged normally to connect the coder 31 by way of gates 35 to a free register 34. Thus, when a pulse is supplied over the lead 32 to characterize a calling extension party, signals are supplied by the coder 31 to the register 34 that is then allocated thereto and the register 34 stores the appropriate coded number. A common decoder 36 is connected to each register 34 (over a group of leads represented by the line 37) and upon a number being stored by the register 34 in the manner just discussed, the decoder 36 causes a signal to be supplied over a lead 38 that is individual to the line unit 5 of the extension party in question.

The signals supplied over the lead 38 by the decoder 36 cause a relay LMK in the line unit 5 to be operated.

Each "A" switch unit 21 has an associated A–B access circuit 41. Upon operation of the relay LMK in the line unit 5 in question, contacts LMK1 complete a circuit to operate the relay AB in the associated A–B access circuit 41 while contacts LMK2 prepare a circuit for subsequently supplying s signal to operate a relay A, which is one of the 10 A switches connected to the line wires 26.

The register 34 at this time also supplies a signal over a lead 42 to operate a relay T in each extension supervisory unit 6 regardless of whether or not that unit is already in use.

The H-wires of the 10 A–B links 24 (FIG. 2) terminating on each A switch unit 21 are arranged to be connected via the associated A–B access circuit by way of 10 resistors each of 100,000 ohms to a source of +50 volts. Thus, upon the relay AB in the AB access circuit 41 associated with the A switch unit 21 operating as aforesaid, contacts AB2 cause a +50-volt source (represented by the battery 43) to be connected over resistors 44 to the 10 H wires 45 (only one of which is shown) of the 10 A–B links terminating on the A switch unit 21 under consideration, each of the resistors 44 having a value of 100,000 ohms. Since the H-wires 45 of those A–B links that are then in use are already at a negative voltage (due to the flow of holding current through operated A, B and C switches, this voltage condition only appears on the H-wires 45 of those A–B links that are free.

At this time a signal is supplied by the seized register 34 over a lead 51 to six bistable circuits 46 to 50 and 98 in the control apparatus 17 so as to set all those circuits to a particular state.

Each C switch unit 23 has an associated B–C access circuit 52 and each access circuit 52 has a trio of test leads 53. It will be recalled that each C switch unit 23 has a plurality of supervisory units 6, 7 and 8 connected thereto but that there are not more than three supervisory units of any one type connected to any particular C switch unit 27. The test leads 53 are multipled to the supervisory units 7 and 8 connected to the C switch units 23 although each lead 53 is connected to only one supervisory unit of any particular type that is connected to any particular C switch unit 23.

When the relay T of each extension supervisory unit 6 of the exchange is operated as aforesaid, a signal is supplied over contacts T1 to those leads 53 of the B–C access circuits 52 that are connected to supervisory units 6 that are not then in use, this signal being suppressed by way of contacts B52 if the unit is already in use.

Each B–C access circuit 52 has a gate 54 connected to the three test leads 53 so that a signal is supplied by the gate 54 if one or more of the extension supervisory units 6 connected to the associated C switch 23 is free. At this time a signal is also supplied over a lead 55 (due to the bistable circuit 47 having been set as aforesaid). The coincidence gate 56 thus supplies a signal to a gate 57 if there is such a free extension supervisory unit 6 and this gate 57 is arranged then to supply a signal of +50 volts to a lead 58. Ten resistors 59, each having a value of 100,000 ohms are connected between the lead 58 and the 10 H-wires 60 (only one of which is shown) of the 10 B–C links 25 (FIG. 2) connected to the C switch unit 23 associated with the particular B–C access circuit 52. The +50 volts is applied through a 100,000-ohm resistor to the H-wires 60 of all those B–C links that may be connected through a C switch unit 23 to a free extension supervisory unit 6 although, as in the case in the H-wires 45 of the A–B links previously described, this voltage condition is suppressed by the flow of holding current in respect of those B–C links that are in use.

In the control apparatus 17 there are provided 10 detector circuits 61 which are associated one with each of the 10 B switch units 22. More particularly each detector circuit 61 is connected by way of diodes 62 and 63 to the H-wires 45 and 60 of all the A–B and B–C links connected to the associated B switch unit 22. Each detector circuit 61 is arranged to test the voltage on the two leads 64 and 65 that are connected thereto and to supply a signal to an associated gate 67 only when both those leads are appreciably positive with respect to earth.

The circuit of a detector circuit 61 is shown in FIG. 10. When either, or both, of the leads 64 and 64 is at earth potential, the point 101 is maintained at a small negative voltage due to the flow of current through the resistors 102 and 103 so that the diode 104 is nonconducting and the transistor 105 is cut off. Only when an appreciable voltage, approaching +50 volts, is applied to each lead 64 and 65 are the diodes 106 both nonconducting so as to permit the voltage at the point 101 to rise and thereby forward-bias the diode 104 and cause the transistor 105 to conduct. When this occurs, a signal (earth potential) is supplied over a lead 66 to the associated gate 67.

Returning now to FIGS. 3, 4, 6 and 7, each detector circuit 61 supplies a signal at this time over its lead 66 if (1) there is a free A–B link from the A switch unit 21 to which the calling party is connected to the B switch unit 22 associated with that detector circuit 61 and (2) there is a free B–C link from a C switch unit 23 having a free extension supervisory unit 6 to the particular B switch unit 22.

Initially any signal on a lead 66 is passed through an associated coincidence gate 67 (which may be combined with the associated detector circuit 61), signals being present at this time on leads 68 and 69 due to the bistable circuit 47 having been set as aforesaid, and the signals passed by all the gates 67 are combined by a gate 71. Shortly after the register 34 has supplied a signal over the lead 51 as aforesaid, a signal is supplied over a lead 72 to initiate a sequence for finding a free route for the desired connection and coincidence of this signal with a signal supplied by the gate 71 (signifying that such a route is available) is detected by means of a gate 73 which then supplies a signal to trigger the bistable circuit 46. The absence of such a signal is detected by another gate 74 which then supplies a signal to operate a relay NLA, contacts NLA1 causing a signal to be passed back to the register 34 over a lead 106 to release the register and abandon the attempt to set up the call.

Upon the bistable circuit 46 being triggered by a signal supplied by the gate 73, the previously present signal is removed from the lead 75 so that the signals present on the leads 55 connected to all the B–C access circuits 53 are removed. Signals are however now supplied to those leads 55 in turn by means of a circulating binary register 76 which acts as a C switch unit scanner. At this time clock-pulses supplied by a generator 77 are supplied to the circulating register 76 by way of a lead 78 and a gate 79, the gate 79 also having a signal supplied thereto at this time by the bistable 48 which is in the state to which it was earlier set by the signal supplied over lead 51. (It may be mentioned here that the generator 77 supplies two interlaced trains of clock-pulses over leads 78 and 81.)

A short time after the bistable circuit 46 has been triggered by a signal supplied by the gate 73, this delay being introduced by a delay device 82, a gate 83 is arranged to respond to any signal supplied by the gate 71. When such a signal is passed by the gate 71, it signifies that a C switch unit 23 has been found that is suitable for the required connection and the signal passed by the gate 23 it utilized to trigger the bistable circuit 48 thereby interrupting the supply of clock-pulses to the circulating register 76.

Upon the bistable circuit 48 being triggered as just described, a gate 112 in the B–C access circuit 52 associated with the selected C switch unit 23 supplies a signal (earth potential) to a lead 113 so as to operate relays CB, 1BC and 2BC in that access circuit.

The control apparatus 17 then interrogates the ten B switch units 22 in turn in similar manner to the interrogation of the C switch units 23 just described. For this purpose a B switch unit scanner is formed by two circulating binary registers 84 and 85, a unique combination of signals supplied by these two registers over leads such as the leads 68 and 69 being passed in turn to each gate 67 so that each detector circuit 61 is effectively connected sequentially to the gate 71.

When subsequently a signal is passed by the gate 71, signifying that a suitable B switch unit 22 for the required connection has been found, it is utilized by way of gates 83 and 86 to trigger the bistable circuit 47 and thereby interrupt the supply of clock-pulses to the circulating register 84.

Signals supplied by the circulating register 84 are arranged to operate relays X, Y and Z while signals supplied by the register 85 are arranged to operate relays S, U, V and W. As each B switch unit 22 is interrogated, one of the relays X to Z and one of the relays S to W is operated and accordingly the particular relays that are operated when the B switch unit scanner stops scanning is characteristics of the B switch unit 22 that is to be used for the required connection.

The three (or less) extension supervisory units 6 which are connected to the selected C switch unit we are next interrogated. This is done by looking at the three test leads 53 that are connected to the three units in question, these leads being connected to gates 87 by way of contacts CB1, CB2 and CB3.

Upon the bistable circuit 47 being triggered as aforesaid by a signal supplied by the gate 86, a signal is passed to a gate 88 which at that time also has a signal supplied thereto by a delay device 89. Thus upon the next clock-pulse being supplied by the generator 77 over the lead 81, a pulse is passed by the gate 88 to trigger the bistable circuit 49. This in turn permits clock-pulses supplied over the lead 78 to be passed by way of a gate 89 to a three-state supervisory scanner which is again formed by a circulating binary register 91. The register 91 is arranged to supply signals in turn to the three gates 87. When one of the leads 53 that has a signal supplied thereto (by way of contacts T1 in a free supervisory unit 6) is interrogated in this way, a signal is passed by the appropriate gate 87 and by a gate 92 so as to permit a clock-pulse to be passed by a gate 93 to trigger the bistable circuit 50. This causes the supply of clock-pulses to the circulating register 91 to be interrupted and at the same time a relay MKL is operated.

Upon the relay MKL operating, the relays A, B and C which constitute A, B and C switches respectively in the required connection between the line wires 26 and a free extension supervisory unit 6, the selected C switch unit 23 being determined by the state of the register 76, the unit 6 (of those connected to the selected C switch unit 23) being determined by the state of the register 91, and the selected B switch unit 22 being determined by the state of the registers 84 and 85.

Thus contacts MKL4 close to complete a circuit to operate one of three relays L, M, and N, depending on the state of the register 91 and as a result +50 volts is applied over contacts L1 (say), contacts CB6 (say) in the appropriate B–C access circuit 52, and contacts T2 to the H-wire 107 in the selected extension supervisory unit 6. At the same time contacts MKL3 complete a circuit by way of contacts S1 and X1, say, and contacts 2BC5, say, in the B–C access unit 52 to operate the relay C. A circuit to operate the relay B is then completed over contacts C4, contacts MKL2 and contacts AB3 in the appropriate A–B access circuit 41. Firstly the relay A is operated over contacts B4, MKL1, AB1 in the appropriate A–B access circuit 41 and LMK2 in the appropriate line unit 5. To ensure that sufficient voltage is applied to each of the relays A, B and C to operate them, the zener diodes 108, 109 and 110 are selected to have breakdown voltage of 10 volts, 20 volts and 30 volts respectively.

A path for the subsequent transmission of dial impulses and speech signals is thus set up by way of contacts A, A2, B1, B2, C1 and C2 from the calling extension party to the selected extension supervisory unit 6 and through the transmission bridge 94 of that unit to a pair of leads 95. Relay A in the unit 6 is thus operated and this in turn causes relay BS to operate, contacts BS1 completing a holding circuit for the operated relays A, B and C by way of contacts A4, B4 and C4.

Figure 5:
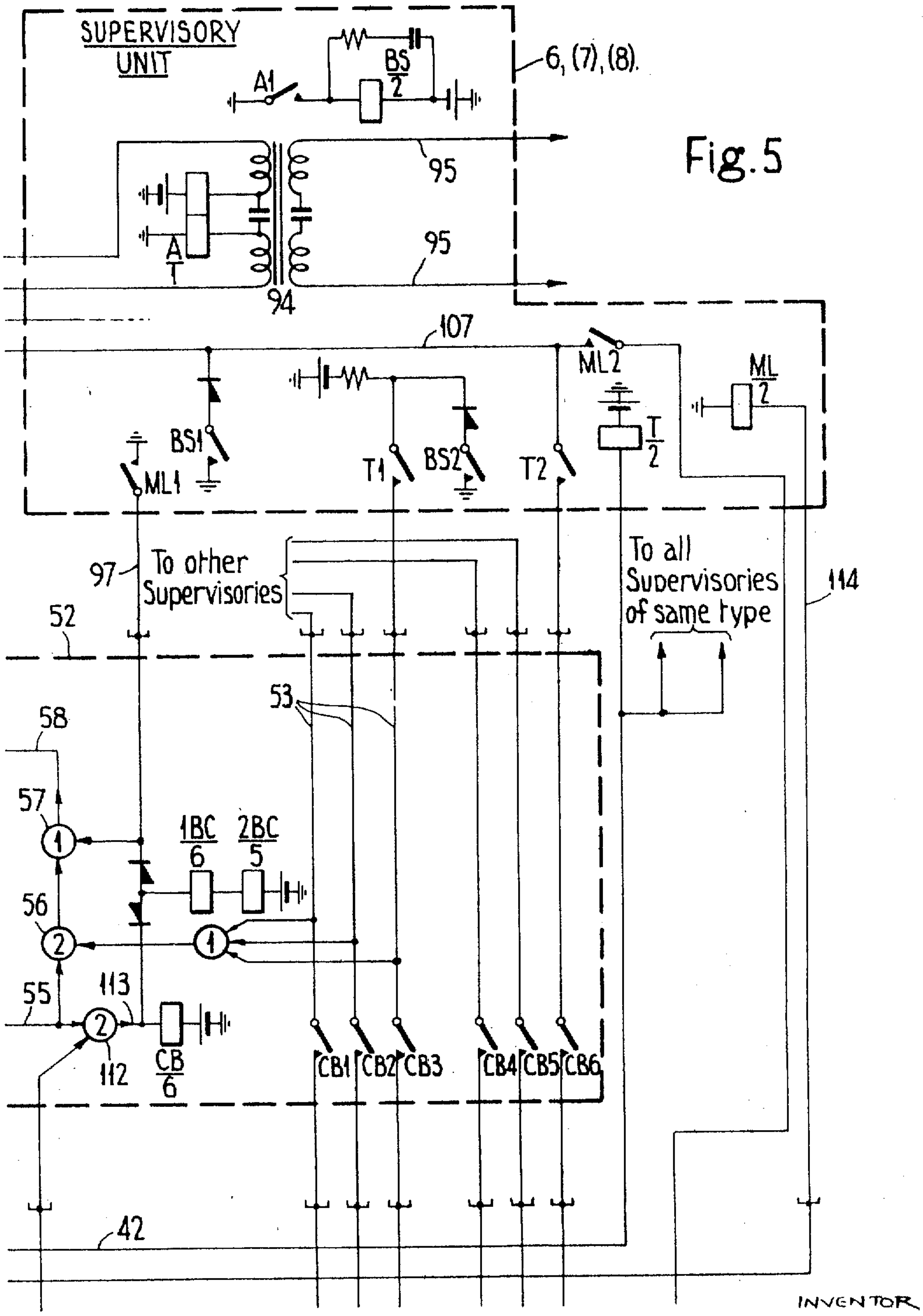

The extension supervisory unit 6 is only shown in FIG. 5 in skeleton form as far as is relevant to the present invention. The leads 95 are however connected, by way of a register access switch (not shown) to the register 34 that has already been taken into use for the call under consideration. At this time dial tone is returned by the extension supervisory unit 6 to the calling extension by way of the operated contacts A1, A2, B1, B2, C1 and C2.

The calling extension then proceeds to dial the wanted number and if the calling extension wishes to be connected to an operator or over a tie line route connected to the exchange, this is recognized by the first digit received by the register 34. The register 34 then supplies a signal over the appropriate lead 96 (corresponding to the lead 42 which is connected to all the extension supervisory units 6) to all the junction supervisory units 7 of the required tie line route or to all the service supervisory units 8 if the required connection is to an operator. A relay corresponding to the relay T in the appropriate type of supervisory unit is thus operated while the register 34 causes the decoder 36 again to supply a signal over the lead 38 to characterize the calling extension party. A sequence of operations similar to that previously described is then carried out to establish a free route and subsequently to set up a connection between the calling party and a free supervisory unit 7 or 8 of the appropriate type.

When now a connection is to be set up through the switching stages 1, 2 and 3 (FIG. 1) between a junction supervisory 7, say, to which a calling party is connected and a called extension party connected to the exchange under consideration, a register 34 that has previously been taken into use for the call receives the digits characterizing the wanted extension party and causes the decoder 36 to supply a signal over a lead, such as the lead 38, to operate the relay LMK in the line unit 5 of the called extension party and also supplies a signal over the lead 96 to operate the relay T in all the junction supervisory units 7. Closure of contacts LMK1 complete the circuit to operate the relay AB in the associated A–B access circuit 41 and thereby cause the previously considered voltage condition to be applied to the H-wires 45 of the free A–B links connected to the A switch unit 21 to which the called party is connected. At this time the relay ML in the junction supervisory unit 7 to which the called party is connected is operated by a signal supplied by the register 34 over a lead 114 so that the lead 97 connected to the appropriate unit 7 is 'marked' by being earthed over contacts ML1. In the associated B–C access circuit 52, this causes relays 1BC and 2BC to be operated and causes the gate 57 to supply +50 volts over the lead 58 to the ten resistors 59. +50 volts is then applied, as previously, to the H-wires 60 of all the free B–C links connected to the C switch unit 23 to which the marked junctions supervisory unit 7 is connected.

The subsequent operation of the control apparatus 17 to establish the required connection through the switching stages, 1, 2 and 3 is essentially the same as that previously considered although, in this case, it is not necessary to select a C switch unit 23 since the relevant unit is already known. For this purpose a signal is supplied at this time by a bistable circuit 115 over a lead 116, this circuit 115 having been set to the appropriate state by a signal supplied by the register 34 over a lead 117. (It may be mentioned that in the cases previously considered, the circuit 115 was set to its other state by a signal supplied over the lead 118.) The signal on the lead 116 is passed through a gate 119 to the coincidence gate 112 in the B–C access circuits 52 so as to operate the relay CB in that circuit.

When the appropriate B switch unit 23 has been selected, the relay MKL is operated as before but on this occasion, positive voltage is applied to the H-wire 107 in the appropriate supervisory unit 7 by way of normally closed contacts MB1 in the apparatus 17 and contacts ML2 in the unit 7. The relays A, B and C are operated in similar manner to previously, although immediately prior to operation of the relay A, the presence of the necessary operating voltage for that relay is detected on the lead 120 by a circuit 121 which then supplies a signal to trigger the bistable circuit 98 and thereby operate the relay MB. By the time this has occurred the relay A is operated so that the holding circuit for the relays A, B and C is set up as previously described before the contacts MB1 open to interrupt the operating circuit for those relays.

I claim:

1. A telecommunications switching system comprising only three switching stages which are subsequently referred to as the A, B and C stages and each of which comprises electric switches forming a plurality of switching matrices, the switching matrices of the A, B and C stages being subsequently referred to as A switch units, B switch units and C switch units respectively, a plurality of speech paths connected to one side of the A switch units, a plurality of units, a plurality of links units to one side of the B switch units to provide only a single link from each A switch unit to each B switch unit and which links are subsequently referred to as A–B links and each comprise a plurality of conductors, a plurality of links connecting the other side of the B switch units to one side of the C switch units to provide only a single link from each B switch unit to each C switch unit and which links are subsequently referred to as B–C links and each comprise a plurality of conductors, a plurality of supervisory units of each of a plurality of different types which types of units are utilized when the system is handling different types of call, circuit means to connect said supervisory units to the other side of the C switch units so that each C switch unit is thereby connected to supervisory units of at least two different types, route selecting means to select a free route through the A, B and C stages between any one of said speech paths and a supervisory unit of any particular type to which that speech path is required to be connected, and means to operate the appropriate switches in the A, B and C stages to establish a connection therethrough over the route selected by the last-mentioned means, said route selecting means comprising means to apply a first voltage to one conductor of each free A–B link that is terminated by the A switch unit to which is connected the input path to which connection is required through the switching stages, scanning means to apply a second voltage to one conductor of each free B–C link that is terminated by each C switch unit in turn that is connected to at least one free supervisory unit of the type to which the speech path requires connection through the switching stages, testing means connected to said conductors of all the A–B and B–C links, C switch unit selecting means to stop the scanning operation of the scanning means in response to the testing means detecting the first and second voltages respectively on the conductors of an A–B link and a B–C link terminating on the same B switch unit which at this time is unidentified so that the second voltage continues to be applied to the conductors of all free B–C links that are connected to the selected C switch unit, scanning and testing means subsequently to test the voltages on said conductors of all A–B and B–C links terminating on each B switch unit in turn, B switch unit selecting means to stop the scanning operation of the last mentioned means in response to detection thereby of the first and second voltages respectively on the conductors of an A–B link and a B–C link terminating on the B switch unit then being scanned, and supervisory unit selecting means to select a free supervisory unit of the required type connected to the C switch unit selected by the C switch unit selecting means.

2. A system according to claim 1 wherein the route selecting means also includes free route availability checking means to ascertain that a free route is available before operation of the scanning means, the free route availability checking means comprising means to supply the second voltage to said conductor of each free B–C link that is terminated by every C switch unit that is connected to at least one free supervisory unit of the type to which the speech path requires connection, and further testing means to effect a single test for the presence of the first and second voltages respectively on A–B and B–C links terminating on any one of the B switch units.

3. A system according to claim 1 wherein the first and second voltages are the same.

4. A system according to claim 1 wherein each B switch unit has a testing circuit which is connected to said conductor of all the A–B and B–C links terminating on that B switch unit to detect the simultaneous application of the first voltage on any one of the A–B links and of the second voltage on any one of the B–C links.

5. A system according to claim 1 wherein the number of supervisory units of any one type that are connected to any one C switch unit does not exceed three.